United States Patent [19]

Gagnon et al.

[11] 3,716,415
[45] Feb. 13, 1973

[54] FUEL CELL ELECTROLYTE CONCENTRATION CONTROL

[75] Inventors: Richard N. Gagnon, Glastonbury; Carl V. Banic, Cromwell; Albert P. Grasso, Vernon, all of Conn.

[73] Assignee: United Aircraft Corporation, East Hartford, Conn.

[22] Filed: March 29, 1971

[21] Appl. No.: 128,775

[52] U.S. Cl. .................................................136/86 B
[51] Int. Cl. ............................................H01m 27/00
[58] Field of Search......136/86 B, 86 C, 86 R; 73/29, 73/338; 204/232

[56] References Cited

UNITED STATES PATENTS

| | | | |
|---|---|---|---|
| 3,112,229 | 11/1963 | Bacon et al. | 136/86 C |
| 3,287,167 | 11/1966 | Weiss et al. | 136/86 C |
| 3,322,574 | 5/1967 | Justi et al. | 136/86 C |

Primary Examiner—Winston A. Douglas
Assistant Examiner—H. A. Feeley
Attorney—Laurence A. Savage

[57] ABSTRACT

A fuel cell electrolyte concentration control is provided by wet bulb and dry bulb temperature sensors disposed downstream of a fuel cell in a reactant gas recirculation conduit; excess electrolyte diluent removal means are provided and are controlled by control means as a function of the difference between the sensed dry bulb and wet bulb temperatures.

4 Claims, 3 Drawing Figures

INVENTORS
RICHARD N. GAGNON
CARL V. BANIC
ALBERT P. GRASSO
BY Lawrence A. Savage
ATTORNEY

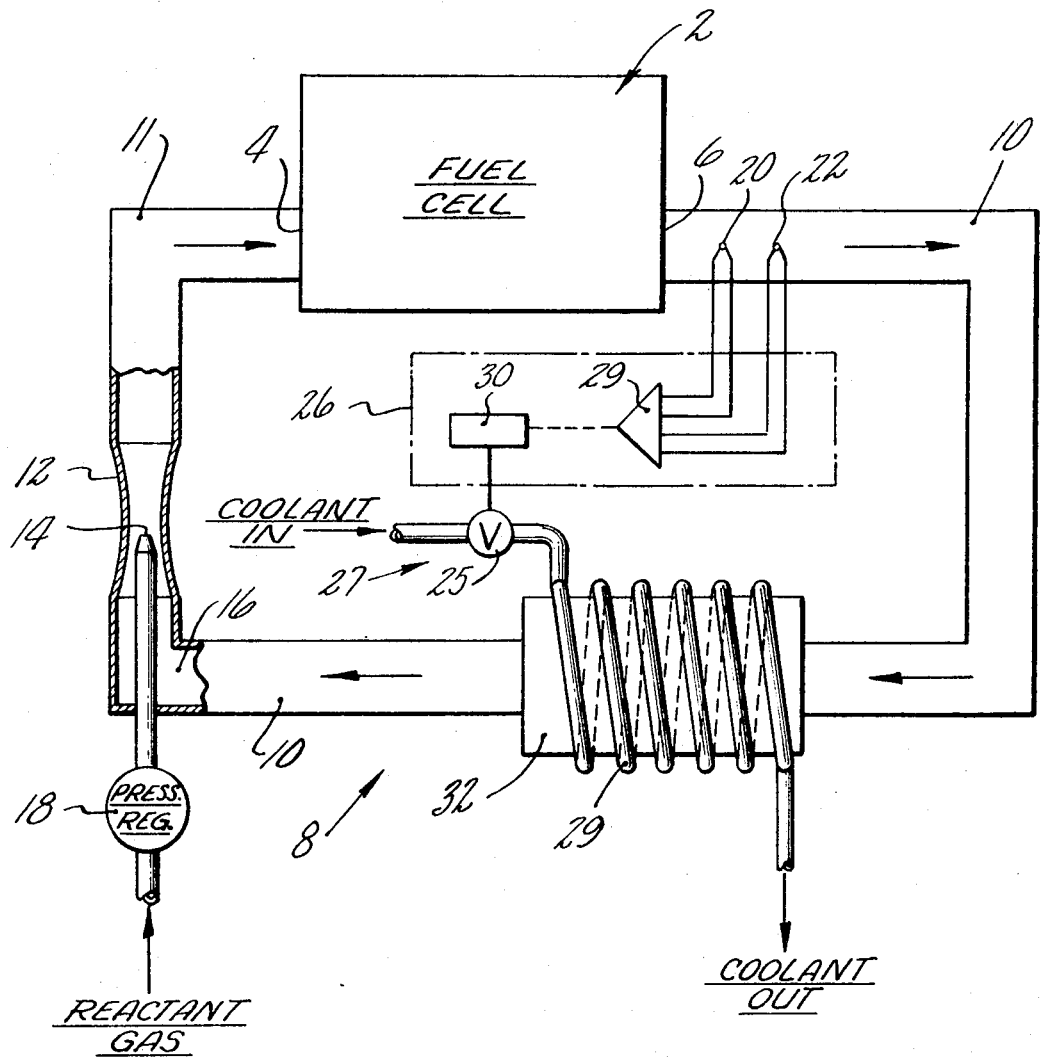

FUEL CELL ELECTROLYTE CONCENTRATION CONTROL

BACKGROUND OF THE INVENTION

Field of the Invention

This invention relates to a fuel cell electrolyte concentration control and particularly to a control utilizing the difference between the wet bulb temperature and the dry bulb temperature of a recirculating reactant gas flow to control the electrolyte concentration.

Description of the Prior Art

Fuel cell product water management control systems for controlling electrolyte concentration known in the art have generally required accurate control of system temperatures and reactant gas recirculation flow rates. This is undesirable because it means that the absolute temperature of the cell stack must be accurately controlled and/or coordinated with the other system variables, thereby leading to a complex control system for the fuel cell. Our invention obviates these undesirable features and allows control of the electrolyte concentration by an extremely simple control.

SUMMARY OF THE INVENTION

The object of the present invention is to control the electrolyte concentration in an electrochemical cell with a simple, yet accurate control which does not require accurate control of system temperatures and/or reactant gas recirculation flow rates.

In accordance with the present invention an electrolyte concentration control for an electrochemical cell is provided by the combination of a wet bulb temperature sensor and a dry bulb temperature sensor disposed downstream of the fuel cell in reactant gas recirculation means, means for removing the excess electrolyte diluent from the reactant gas recirculation flow, and control means for controlling the excess electrolyte diluent removing means as a function of the difference between the wet bulb temperature and the dry bulb temperature of the reactant gas recirculation flow.

We have found that over a wide range of cell temperatures a given electrolyte concentration is reflected in a relatively fixed value of the difference between the wet bulb temperature and the dry bulb temperature of the stream of the exiting reactant gas in which the electrolyte diluent is produced, such as the fuel gas in a base electrolyte fuel cell or the oxidant gas in an acid electrolyte fuel cell. An allowable band for electrolyte concentration is reflected in an allowable band in the wet bulb-dry bulb temperature difference. This temperature difference may be controlled simply by either controlled venting of the reactant gas recirculation flow in an open cycle mode of operation, or by controlling the quantity of reactant gas recirculation flow to a condenser in series with the fuel cell in a closed cycle mode of operation, or by controlling the cooling means of the condenser. The absolute temperature of the cell stack need not be accurately controlled or coordinated with the other system variables.

The foregoing and other objects, features and advantages of the present invention will become more apparent in light of the following detailed description of preferred embodiments thereof, as are illustrated in the accompanying drawings.

BRIEF DESCRIPTION OF THE DRAWINGS

FIG. 3 is a schematic illustration of still another embodiment of an electrolyte concentration control in accordance with our invention.

DESCRIPTION OF THE PREFERRED EMBODIMENT

Figure 1:
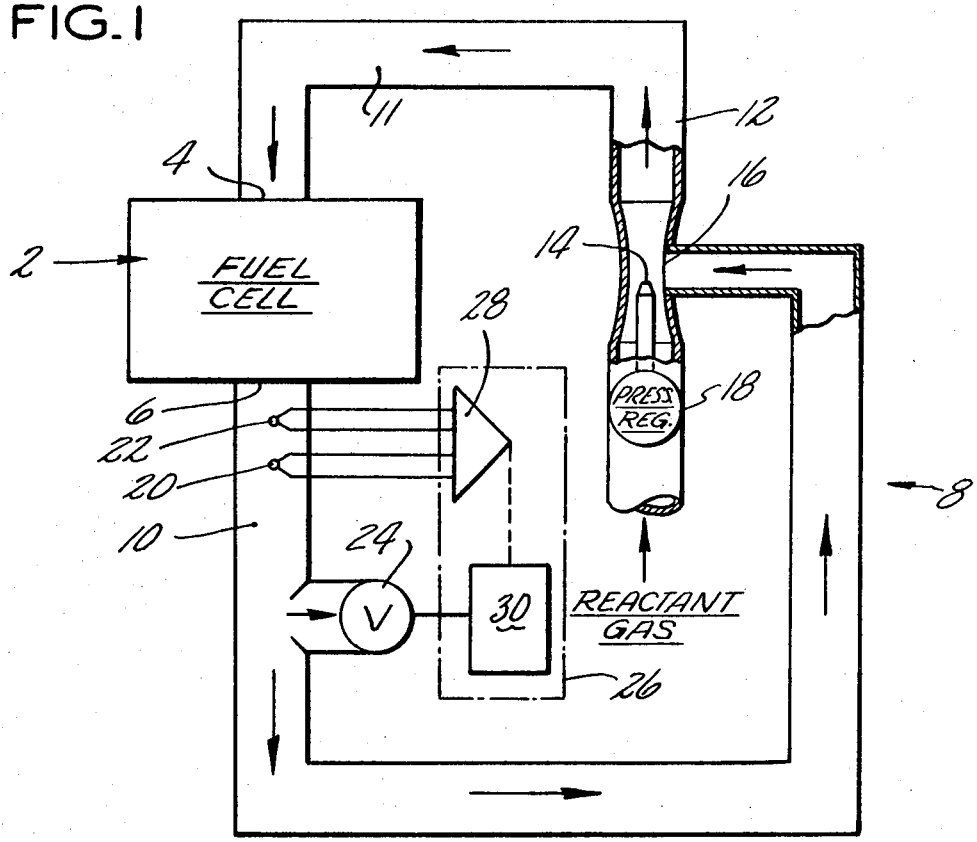
FIG. 1 is a schematic illustration of one embodiment of an electrolyte concentration control in accordance with the present invention.

Referring to FIG. 1, there is shown a fuel cell 2 having a reactant gas inlet 4 and a reactant gas outlet 6. Reactant gas recirculation means, shown generally by the numeral 8, connect the outlet 6 with the inlet 4 by means of conduits 10 and 11 and may include an ejector 12 for recirculating the reactant gas flow. The ejector 12 is powered by high pressure reactant gas which is fed to the primary nozzle 14 of the ejector and the recirculating reactant gas is fed to the secondary nozzle 16 of the ejector. A pressure regulating valve 18 may be provided to regulate the pressure of the incoming reactant gas. Of course as will be understood by one skilled in the art, it is not necessary to utilize an ejector to recirculate the reactant gas; a pump or fan could be used instead. Wet bulb temperature sensing means 20, which may be like that disclosed in the patent application of Stedman and Grasso, Ser. No. 128,772 filed on the same day as, and assigned to the same assignee of the instant application, and dry bulb temperature sensing means 22, which may be a thermocouple or any of the various thermometers known in the art, are disposed in the conduit 10 downstream of the fuel cell 2. Valve means 24 is disposed in the conduit 10 downstream of the temperature sensing means 20 and 22. Control means 26, shown by the dashed-line box, operatively connect the temperature sensing means 20 and 22 to the valve means 24. The control means may comprise an amplifier 28 and a valve actuator 30. The control may be either of a proportional type, i.e., one which opens or closes the valve ambient proportionately as the difference between the wet bulb and dry bulb temperatures decreases or increases, respectively, or of an on-off type, i.e., one which opens the valve to ambient when the difference between the wet bulb and dry bulb temperature decreases to a predetermined limit and closes the valve when that difference increases above the predetermined limit.

Figure 2:
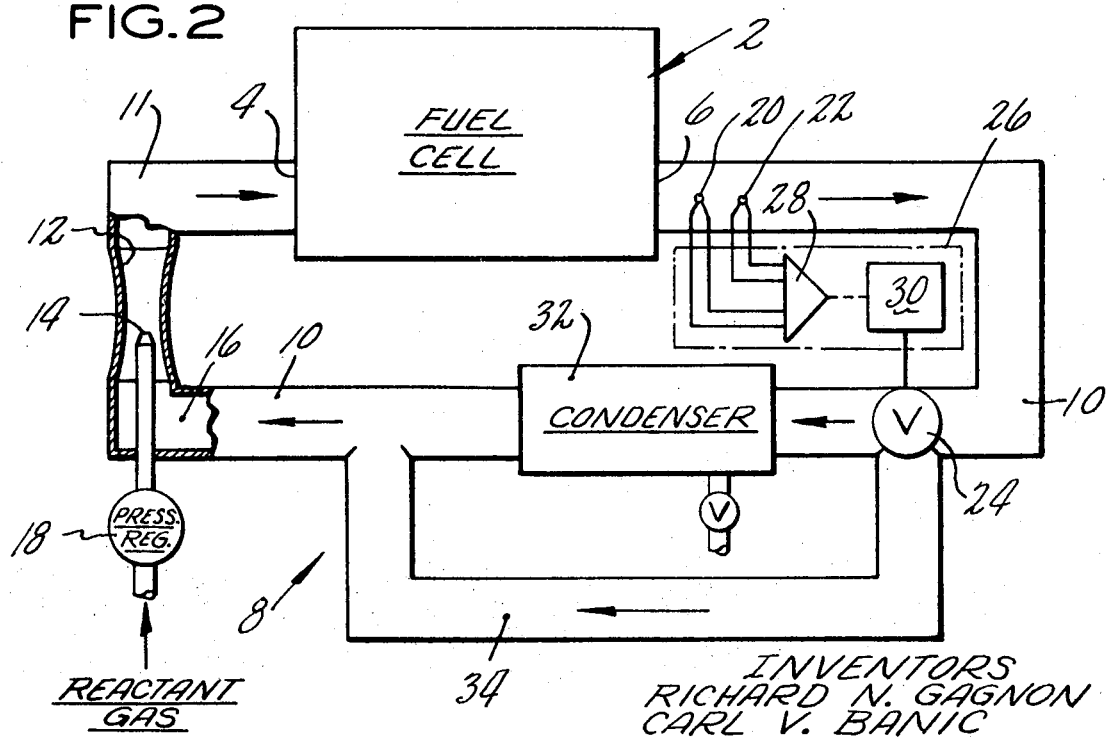
FIG. 2 is a schematic illustration of another embodiment of an electrolyte concentration control in accordance with the present invention.

In FIG. 2 like components have like numerals. In this embodiment, excess electrolyte diluent is removed by a condenser 32 instead of venting a portion of the recirculating reactant gas and excess electrolyte diluent to ambient as shown in FIG. 1. Valve means 24 may be a three-way type valve operatively connected to the dry bulb and wet bulb temperature sensing means 20 and 22 by the control means 26. Again the valve means 24 may be either of the proportional type, which modulates proportionately to direct an increasing or decreasing quantity of recirculating reactant gas through the condenser 32 as the difference between the dry bulb and wet bulb temperatures decreases or increases, respectively, or of the on-off type, which normally directs all the flow through the bypass 34 around the condenser and which modulates to direct all the flow through the condenser when the difference between the wet bulb and dry bulb temperatures decreases to a predetermined limit and then modulates to direct all the flow to the bypass 34 again when that temperature difference goes above the predetermined limit. As will be understood by those skilled in the art, the valve means 24 may be just as effectively disposed downstream of the condenser 32 at the junction of the bypass 34 and the conduit 10.

Referring now to FIG. 3, wherein like numbers refer to like components, another embodiment is shown in which excess electrolyte diluent is removed by a condenser 32 which has variable cooling means 27 for regulating the amount of diluent condensed in the condenser, instead of the valve 24 and bypass 34 shown in FIG. 2. In this embodiment all the reactant gas recirculation flow passes through the condenser and the control means 26 modulates the valve 25 to regulate the amount of coolant flowing through the coil 29; again the valve could be of the proportional type or the on-off type. It will be understood by those skilled in the art that other types of variable cooling means known in the art could be used, such as a fan having a motor which is controlled by the control means 26, for example. As will be obvious, the amount of electrolyte diluent condensed by the condenser 32 depends on the amount of cooling provided by cooling means 27.

It will be understood by those skilled in the art that various fuel cells known in the art may advantageously utilize the present invention for clarity of the drawings, various details of the fuel cell have been omitted, such as electrodes etc. and the inlet and outlet for another reactant gas.

There has thus been described a preferred embodiment of an electrolyte concentration control for a fuel cell in accordance with the present invention. It will be understood by those skilled in the art that various changes and omissions in the detail thereof may be made therein without departing from the spirit and scope of our invention.

What we claim as new and desire to secure by Letters Patent of the United States is:

1. An electrolyte concentration control for a fuel cell, comprising:

A fuel cell having a reactant gas inlet and a reactant gas outlet;

reactant gas recirculation means connecting said reactant gas outlet with said reactant gas inlet for recirculating the reactant gas in which an electrolyte diluent is produced by the energy conversion process of the fuel cell;

wet bulb temperature sensing means disposed downstream of said fuel cell in said reactant gas recirculation means;

dry bulb temperature sensing means disposed downstream of said fuel cell in said reactant gas recirculation means;

excess electrolyte diluent removal means for removing excess electrolyte diluent from the reactant gas recirculation flow disposed in said reactant gas recirculation means and control means operatively connected to said excess electrolyte diluent removal means and to said wet bulb temperature sensing means and to said dry bulb temperature sensing means for controlling said excess electrolyte diluent removing means as a function of the difference between the sensed wet bulb temperature and the sensed dry bulb temperature.

2. An electrolyte concentration control for a fuel cell as defined in claim 1, wherein said excess electrolyte diluent removal means comprises a condenser disposed in said reactant gas recirculation means downstream of said wet bulb and said dry bulb temperature sensing means, including fluid bypass means around said condenser and valve means disposed in said reactant gas recirculation means for regulating the flow into said bypass means, said valve means operatively connected to said control means.

3. An electrolyte concentration control for a fuel cell as defined in claim 1, wherein said excess electrolyte diluent removal means comprises valve means disposed in said reactant gas recirculation means downstream of said wet bulb and said dry bulb temperature sensing means for venting a portion of the reactant gas recirculation flow to ambient, said valve means operatively connected to said control means.

4. An electrolyte concentration control for a fuel cell as defined in claim 1, wherein said excess electrolyte diluent removal means comprises a condenser disposed in said reactant gas recirculation means downstream of said wet bulb and said dry bulb temperature sensing means, including variable cooling means for said condenser, said variable cooling means operatively connected to said control means.

* * * * *